United States Patent [19]

Fuhr et al.

[11] 4,282,103

[45] Aug. 4, 1981

[54] METHOD FOR CONTROLLING FLOCCULANT ADDITION TO TAR SAND TAILINGS

[75] Inventors: Bryan J. Fuhr; Joseph K. Liu, both of Edmonton, Canada

[73] Assignees: Petro-Canada Exploration Inc., Calgary; Her Majesty the Queen in right of the Province of Alberta, Government of the Province of Alberta, Department of Energy and Natural Resources, Alberta Syncrude Equity, Edmonton; PanCanadian Petroleum Limited, Calgary; Esso Resources Canada Ltd., Calgary; Canada-Cities Service, Ltd., Calgary; Gulf Canada Resources Inc., Calgary, all of Canada

[21] Appl. No.: 96,177

[22] Filed: Nov. 20, 1979

[51] Int. Cl.$^3$ .................... B01D 21/01; C02F 1/52
[52] U.S. Cl. ......................... 210/709; 208/11 LE
[58] Field of Search ............ 210/42 R, 702, 709, 210/746, 806; 208/11 LE, 11 R

[56] References Cited

U.S. PATENT DOCUMENTS

| 3,399,133 | 8/1968 | Gerdes et al. | 210/42 R |
|---|---|---|---|
| 3,502,575 | 3/1970 | Hepp et al. | 210/42 R |
| 4,225,433 | 9/1980 | Liu | 210/702 |

Primary Examiner—Thomas G. Wyse
Attorney, Agent, or Firm—E. P. Johnson

[57] ABSTRACT

The hot water extraction process for recovering bitumen from tar sand produces a large volume of solids-laden aqueous tailings as a waste product. The solids in the tailings stream may be flocculated by the addition of lime and the components of the stream then separated into a water-free solids phase and a clarified water phase. During flocculation, the zeta potential of the stream is monitored. It rises from an initial negative zeta potential, as the lime is added. Flocculation is terminated when the zeta potential is about zero. At this point, the tailings are in optimum condition for separation into the water-free solids phase and the clarified water phase. Separation is preferably effected by vacuum filtration.

5 Claims, 3 Drawing Figures

ZETA POTENTIAL AND FILTRATION RESULTS FOR $C_aO$ FLOCCULATED TAILINGS

ZETA POTENTIAL AND FILTRATION RESULTS FOR $CaO$ FLOCCULATED TAILINGS

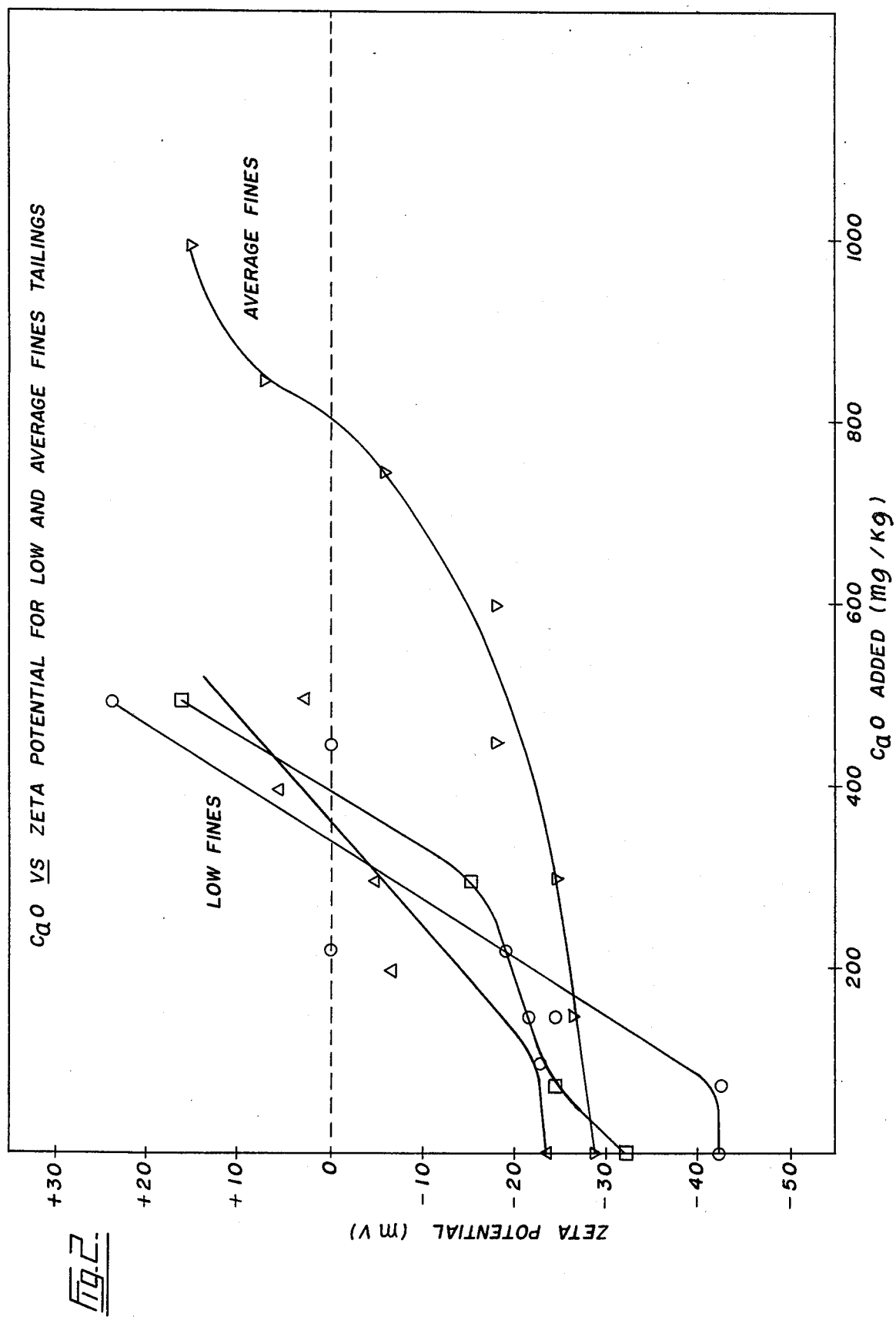

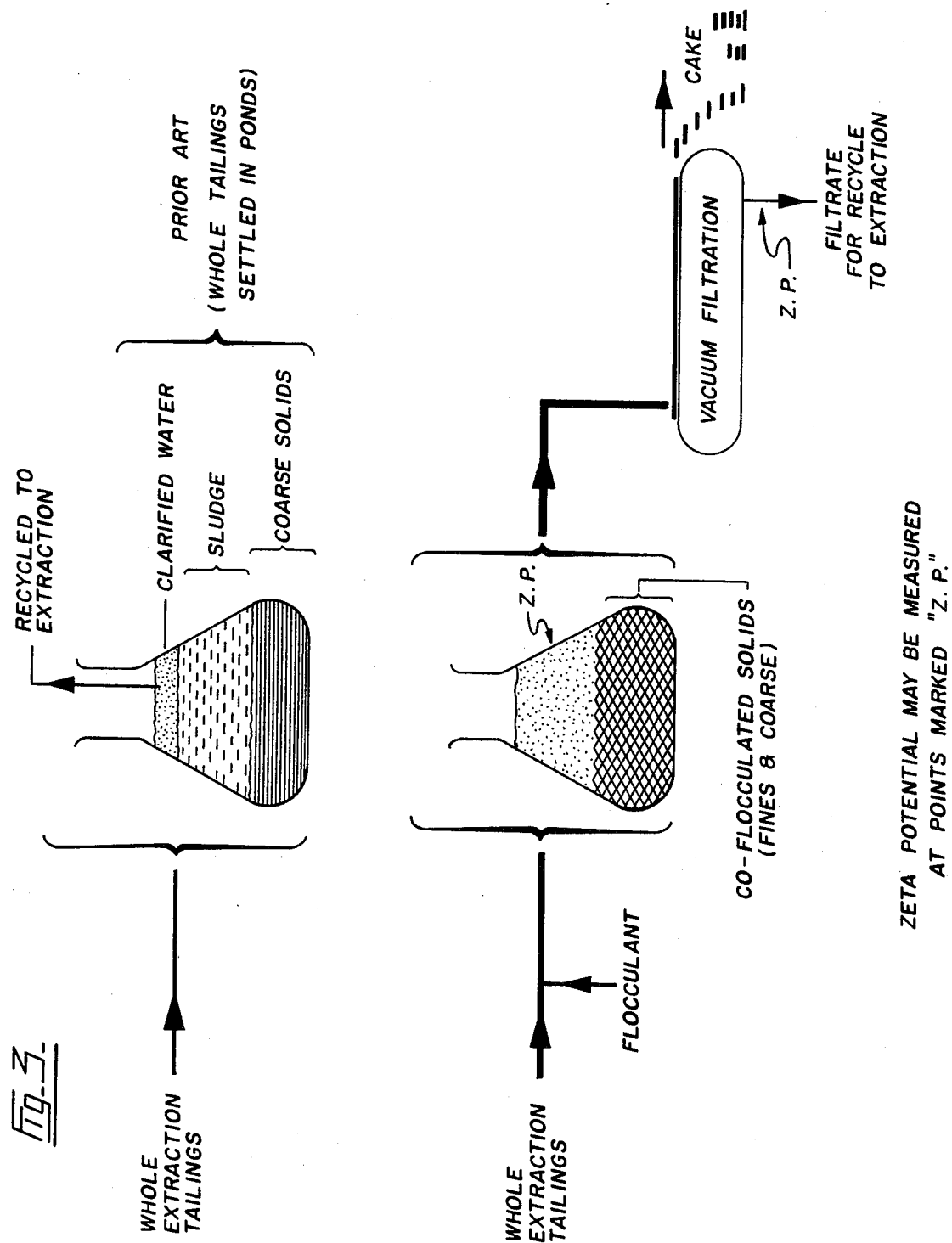

METHOD FOR CONTROLLING FLOCCULANT ADDITION TO TAR SAND TAILINGS

BACKGROUND OF THE INVENTION

This invention relates to an improvement in the treatment of whole tailings produced by the hot water extraction process for recovering bitumen from tar sands.

The urgent need for alternative sources of hydrocarbons, especially for use as fuels, is increasingly apparent as reserves of convential crude oil becomes used up. An extensive source of hydrocarbons is in the bituminous sands found in various parts of the world. Particularly useful deposits of bituminous sands are in Western Canada, where they are commonly known as tar sands.

Such tar sands are often found near ground surface; thus they can be mined and transported to an extraction plant for recovery of the heavy oil (bitumen).

The only commercially used process for recovery of bitumen from mined tar sand is the hot water extraction process. In accordance with this process, the tar sand is fed into a rotating conditioning vessel, known as a tumbler, and mixed with hot water, steam, and small amounts of process aid. The most common process aid is sodium hydroxide; its purpose is to assist in causing the bitumen to be released from the other constituents of the tar sand mass. The process is run so that tar sand takes less than 10 minutes to pass through the tumbler. A slurry emerges from the tumbler. This slurry is screened to remove oversize matter, such as rocks or undigested lumps of tar sand, and then is diluted with additional hot water. The screened, diluted slurry is then advanced to quiescent zone known as the primary separation vessel (PSV). Because the components of the slurry are in only loose association (as a result of the conditioning in the tumbler), they are able to separate in the PSV under the influence of gravity. Hence the sand, which has a gravity of about 2.65, sinks to the bottom of the PSV, and may be pumped out in the form of an aqueous mixture. The bitumen has a density of around 1.00, that is, close to that of water. Left to itself, it tends therefore neither to sink nor to float. But a considerable number of air bubbles have been introduced into the slurry in the tumbler and these attach themselves to the bitumen globules. In this way the bitumen, in an aerated state, rises to the top of the PSV and may be collected in the form of a froth. Some bitumen fails to so rise because the size of the globules is too small or because of failure to get aerated. This unaffected bitumen remains in the central region of the PSV and helps make up a portion known as the "middlings". To increase the efficiency of the process, a middlings stream is continuously withdrawn from the PSV and advanced to induced air flotation cells where, by vigorous agitation and the addition of external air, a second yield of bitumen is obtained in the form of a secondary froth. The froths are then combined and the bitumen is separated from the contaminating water and mineral solids. This is done by diluting the combined froths with a hydrocarbon diluent and separating the diluted bitumen using separatory means such as centrifuges. The diluent may then be distilled out of the hydrocarbon product phase to leave pure isolated bitumen that may then be upgraded by processes known in the heavy oil art.

The hot water process is efficient and has the advantage of operating under mild conditions. A disadvantage is the production of a large volume of solids-laden, aqueous tailings. Provision must be made for storing these tailings and, at least as an intermediate step, they must, according to present practice, be impounded within dykes that must be constructed near the mine area. Such tailings ponds bring undesirable environmental effects, and cover tar sand that is thereby rendered unavailable to mining.

One extraction operation, producing 120,000 bbl. synthetic crude per day will, over the 25 year life of the project, create a tailings pond of around 10 square miles in area. If, as other extraction facilities are built, the same area of tar sand is covered, the whole deposit is significantly reduced in size.

In the tailings pond, the solids are supposed to settle to leave a layer of clear water which can be re-cycled to the extraction process. Once enough fresh water has been taken on board, an extraction plant which is self-sufficient in clarified water may be obtained by this recycle process.

In practice, the coarse solids (i.e. the sand grains) do settle rapidly, but the fine solids (i.e. $-44$ micron fraction) settle only slowly over a period of several years. It would be a great advantage to the tar sand industry if a feasible, rapid water clarification process could be devised.

Workers in the field have turned for guidance to the water clarification art, where large volumes of water are purified for consumption as domestic water. As a result, it has been proposed that coarse solids be first settled out and the fine matter subsequently flocculated by conventional flocculating agents. The flocculated solids could then be removed from the water by centrifuging or filtering. Typical examples of this approach are given in U.S. Pat. Nos. 3,487,003 and 3,502,575, issued to Baillie et al and Hepp et al, respectively.

A new process is the subject of patent application Canadian Ser. No. 311,696, in U.S. Ser. No. 947,996, filed by J. K. Liu et al whose assignees are the same as for the instant invention. The Liu process is based on the discovery that, when flocculant(s) are added to whole tailings (i.e. with the solids unremoved), the coarse particles from nuclei to which the fine particles can adhere. What is produced is a precipitate of aggregates of coarse and fine solids. In this state, the mineral matter can be filtered out without the need for a filter aid. There results a filter cake, small in volume and with little water, and a filtrate sufficiently clear for immediate recycle to extraction. The cake is easy to dispose of because it can be compacted to form a base for reclaimed land. Thus the cake can be disposed of in the mined-out area.

The preferred flocculant in the invention of Liu et al is lime. This is readily available in tar sand regions and does not leave dissolved residues that could be harmful when recycled to extraction. The products of decomposed lime are an insoluble carbonate, and one molecule of water for every reacted molecule of lime. The present invention, that is now summarized, teaches how to optimize the level of flocculant needed.

SUMMARY OF THE INVENTION

To bring whole tailings to a state of preferred readiness for filtration, flocculant is added to the whole tailings. This leads to co-flocculation, with the large-sized grains evidently serving as nuclei for the fine solid particles to attach to. At optimum flocculant dosage the effectiveness of filtration is maximized, leading to rapid filtration rate, low cake moisture, and low solids levels in the filtrate. Too little or too much flocculant prevents the filtration effectiveness being at the maximum. Further, too much flocculant is wasteful of chemicals, and at the huge volumes of tailings involved in an extraction plant, this could represent serious economic cost.

According to the invention, flocculant dosage is controlled in response to the tailings zeta potential. Before flocculating, the tailings have a negative zeta potential. As flocculant is added, the zeta potential rises. At the isoelectric point where zeta potential is substantially zero, it has been found that the tailings are in the most desirable state for filtration.

Therefore, in accordance with the invention, the zeta potential of the tailings is monitored as the flocculant is added to and mixed with the while tailings. When the zeta potential is about zero, the addition of flocculant is terminated and the flocculated tailings are treated, as by vacuum filtration, to produce a substantially water-free solids phase and substantially clarified aqueous phase.

Zeta potential may be monitored by measuring the rate at which a fine particle in suspension travels between two electrodes. This rate depends on the charge of the particle and it is this charge that is known at zeta potential. We have further found that, although the tailings are treated in the whole state with flocculant, the zeta potential of fine particles alone is indicative of the closeness of the stream to maximum filtration effectiveness. When whole tailings are treated with lime flocculant, almost immediately the solids co-flocculate and visibly begin to settle. A substantially clear supernatant liquor is left although this liquor does contain some finely suspended fines. The flocculant may thereafter be added in stages; after each addition a sample of the supernatant may be withdrawn and subjected to zeta potential analysis. The zeta potential increases from a large negative value to zero and then increases on the positive side. At the point of zero potential of the liquor containing the fines, the whole tailings stream is in the preferred condition for filtration. It is not necessary therefore to devise a test to attempt to determine zeta potential of large flocs of co-precipitated solids, since the zeta potential of fines alone indicates the zeta potential state of the co-precipitated matter.

Broadly stated, the invention is an improvement in the hot water extraction process wherein a solids-laden aqueous whole tailings stream is generated as a waste product comprising: treating said whole tailings stream with flocculating agent and monitoring its zeta potential; controlling the amount of flocculating agent added so as to raise the zeta potential of the whole tailings from an initial negative value to about zero; and then separating the constituents of such stream to produce a substantially water-free solids phase and a substantially clarified aqueous phase.

DESCRIPTION OF THE DRAWINGS

FIG. 2 is a plot of zeta potential versus lime added for low fines and average fines tar sands.

FIG. 3 is a schematic representation comparing the prior art with the present invention.

DESCRIPTION OF THE PREFERRED EMBODIMENT

Figure 1:
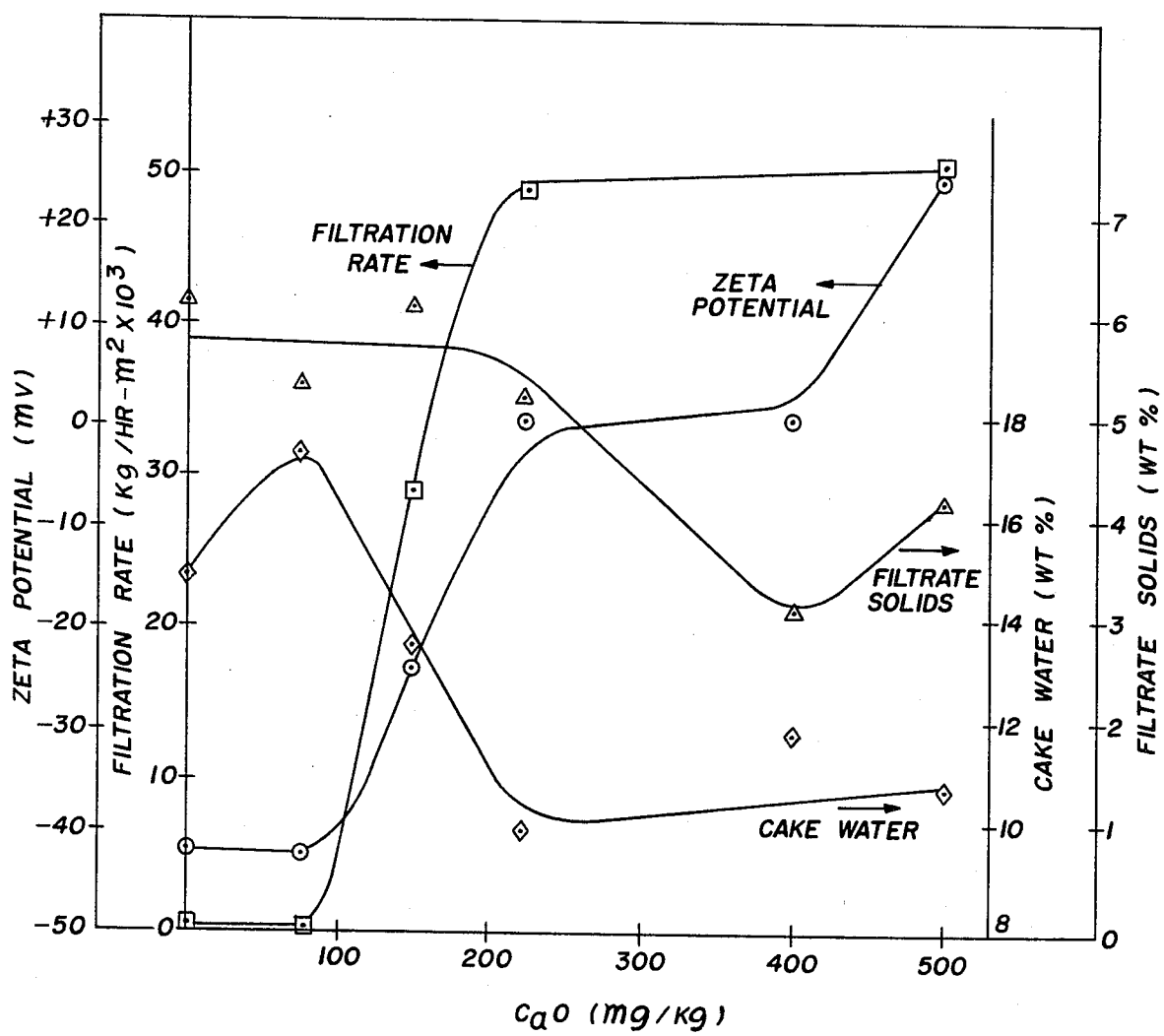
FIG. 1 is a plot of four variables against lime added. The variables were: zeta potential, filtration rate, cake moisture, and solids in filtrate.

The feed for this invention is whole tailings from a tar sand hot water extraction process.

The preferred flocculant is lime. Lime is readily available in tar sand regions in the form of limestone. It is a well known process to convert this to lime by calcining. In use, the lime is mixed with water to form a slurry and it is this slurry that is added as the flocculating agent. We have used a slurry containing about 10 wt. % lime. Since the filtrate is to be recycled to extraction, the flocculant must be chosen from substances that will not allow build-up of species damaging to extraction. Lime has the advantage that the ultimate reaction products of any excess of lime with carbon dioxide in the air are calcium carbonate, which has a low solubility product, and one molecule of water for every molecule of lime. Thus lime does not create compounds which deleteriously affect extraction processing.

The data plotted in FIG. 1 was developed using a Zeta-Meter on samples of a clarified aqueous phase derived from settled whole tailings from a tar sand hot water extraction process. The sample was introduced into an electrophoresis cell and a suitable direct current voltage applied, usually between 100 and 400 volts. The time required for a colloid particle to traverse a fixed distance in the direction of the anode or cathode, as viewed under a microscope, was measured. The observed time was then converted to electrophoretic mobility.

The particular procedure used was as follows:
1. Approximately 50 mL of sample was required to fill the cell. If samples appeared dirty, as was the case with fine clay slurries, such samples were centrifuged at 15,000 rpm for 20 minutes and the clear liquid decanted for analysis. Care was taken to ensure that the sample was at room temperature and the sample temperature was recorded.
2. The cell holder was positioned on the mechanical stage of the microscope. The cell, filled with the sample, was placed on the holder. The stage was then adjusted to position the center of the cell tube directly beneath the optical axis of the microscope.
3. A thin beam of light was focused downward through the plate glass cell holder to its mirror back. This beam was reflected upward and passed through the cell, causing reflecting colloids to be seen as tiny rays of light.
4. The microscope was then focused so that the positioning line of the cell was distinct.
5. A direct current voltage of 100 to 400 V was applied to the cell. If the particles had no charge, they would remain stationary; negative colloids would migrate towards the anode and positively charge colloids would migrate to the cathode.
6. Discrete particles on or near the counting line were timed in their traverse of one or more ocular micrometer divisions using the manual timer. Five or ten discrete particles were timed in their normal direction of travel.
7. The voltage applied across the cell was recorded, as were the objective magnification and the final temperature of the sample.

$$\eta = (\text{objective magnification} \times \text{voltage})/100$$

The following precautions should be noted in carrying out the test. If the voltage is too high, the sample temperature may rise, causing particles to describe a spiral rather than horizontal path. If this occurs, reduce the applied voltage. If the voltage is too low, the particles will settle out and be lost from view. For precise work one should select an optimum voltage and track several particles consecutively and then take an average.

Filtration efficiency was tested by leaf filter tests. According to this test, whole tailings were mixed with the quantity of lime being investigated and the mixture poured into a funnel lined with filter cloth of the type that would be used in a continuous operation. We use 100 mesh U.S. standard sieve. The cloth in the funnel was supported on coarse mesh with openings of about ¼ inch. The funnel was drained into a vacuum flask with a side arm at which point vacuum of known force could be applied. The start of liquid being pulled through the cloth was timed, and a further time reading was taken when the surface of the cake was first seen to be dry. (This occurred quite suddenly and is readily repeatable.) The cake was sucked dry for a further 2 minutes, this being found adequate in all cases to remove free water. The residual cake was then tested for remaining water (by drying a known weight); the filtrate was tested for level of solids (by further filtration through fine mesh, and drying and weighing resultant solids); and the filtration rate was known from the time measurements.

Turning now to FIG. 1, it shows that as the zeta potential approaches zero from the negative side, conditioning of the tailings for filtration reaches maximum effectiveness. Beyond this, lime is added unnecessarily.

In the hot water extraction process, as the level of fines increases in the feed, the dosage of sodium hydroxide (added as a process aid) must likewise be increased to maintain the oil recovery at a maximum. It might be expected that this increase of sodium hydroxide would affect the quantity of flocculant needed to treat the tailings. It was our surprising discovery that, although tailings high in sodium hydroxide began at very negative values of zeta potential, lime addition rapidly brought that potential to zero. On the other hand, tailings from the same type of tar sand, but low in sodium hydroxide, while starting at a less negative zeta potential, had a slower response to lime. That is, for tar sand of the same fines level, but treated with different amounts of sodium hydroxide, the slopes of the curves linking sodium hydroxide to lime vary such that the effect of sodium hydroxide is largely eliminated.

This effect is shown in FIG. 2 which plots zeta potential versus lime added for a low fines and an average fines tar sand. For the low fines runs, the lime needed to bring the zeta potential to zero was between 300 and 350 mg/kg. For the average fines runs the dosage was 800 mg/kg. Different levels of sodium hydroxide added to the extraction process caused the initial zeta potential to vary from −23 to −42 mV but at the isoelectric point the curves tended to collect together.

Probably sodium hydroxide in extraction and lime in flocculation operate by reverse mechanisms. Extraction process aids deflocculate the clay matter in tar sand and hence encourage release of the entrapped bitumen. It is possible that this is an indirect mechanism whereby surface active agents are first produced between the sodium hydroxide and naturally occurring organic acids in the tar sand bitumen and these operate on the clay. The aim of the lime by contrast is to re-flocculate the clay matter, in our case by coflocculation with the coarse solids. It might be expected therefore that, for the same tar sand, different levels of sodium hydroxide would require varying amounts of lime. Our finding that lime requirements are essentially independent of sodium hydroxide content and depend solely on fines content, is an unexpected and welcome simplification of tar sand tailings management.

No test has been devised to measure the zeta potential of flocs of co-precipitated tailings solids. It is a fortunate discovery therefore that the zeta potential of the fines, left in suspension after the majority of the solids are precipitated, may be used to indicate the zeta potential of the whole tailings. Hence, when the zeta potential of the fines alone is brought to zero, the precipitated solids are in the right condition for vacuum filtration. A convenient point to measure the potential of the fines is the filtrate. The small amount of fines reporting to the filtrate is sufficient to allow the required zeta potential measurements to be made. Flocculant slurry may then be added to the whole tailings to give a filtrate potential of zero. In a continuous process batch portions of the filtrate can be withdrawn for testing or a small side stream may be diverted.

FIG. 3 is a fanciful representation of tailings management by the prior art and as taught in the present invention. In the prior art, whole tailings are simply allowed to settle under the influence of gravity. Although the coarse solids settle quickly the sludge of fine solids and clays settles only over a period of several years due to the mutual repulsion of the particles stabilizing the sludge. This slow settling calls for large tailings ponds.

According to the present invention, the whole tailings are flocculated and may be subjected to some rapid separatory means such as vacuum filtration. Although it is the condition of the co-flocculated solids that determines optimum filtration, the zeta potential need be measured only on the fines in the clear aqueous layer. Places where zeta potential may be conveniently measured are marked "z.p.".

It is to be understood that the separatory means may include mere gravity settling of the flocculated whole tailings. If the solids are to be formed into a beach or layed down by such techniques as cone ridging, already taught in the mining tailings or dyke building arts, the invention may be practised in connection with the tailings.

The embodiments of the invention in which an exclusive property or privilege is claimed are defined as follows:

1. In the hot water extraction process, wherein a solids-laden aqueous whole tailings stream, containing coarse and fine solids, is generated as a waste product, the improvement comprising:
   treating said whole tailings stream with flocculating agent to co-flocculate coarse and fine solids and produce settled aggregates thereof;
   simultaneously monitoring the zeta potential of the fine solids left in suspension;
   continuing the addtition of the flocculating agent until said zeta potential is about zero; and
   simultaneous with the treating and monitoring, separating the constituents of the stream to produce a substantially water-free solids phase and a substantially clarified aqueous phase.

2. The improvement as set forth in claim 1 wherein the constituents of the flocculated tailings are separated by vacuum filtration.

3. The improvement as set forth in claim 2 wherein the flocculating agent is lime.

4. The improvement as set forth in claim 3 wherein: the zeta potential of the whole tailings is determined by measuring the zeta potential of fine particles in the substantially clarified aqueous phase.

5. The improvement as set forth in claim 1 wherein the flocculating agent is lime.

* * * * *